US010115028B2

(12) United States Patent
Abhau

(10) Patent No.: US 10,115,028 B2
(45) Date of Patent: Oct. 30, 2018

(54) METHOD AND DEVICE FOR CLASSIFYING AN OBJECT IN AN IMAGE

(71) Applicant: MANDO CORPORATION, Gyeonggi-do (KR)

(72) Inventor: Jochen Abhau, Frankfurt am Main (DE)

(73) Assignee: MANDO CORPORATION, Gyeonggi-Do (KR)

( * ) Notice: Subject to any disclaimer, the term of this patent is extended or adjusted under 35 U.S.C. 154(b) by 6 days.

(21) Appl. No.: 15/081,789

(22) Filed: Mar. 25, 2016

(65) Prior Publication Data
US 2016/0283805 A1 Sep. 29, 2016

(30) Foreign Application Priority Data
Mar. 26, 2015 (DE) ......................... 10 2015 205 524

(51) Int. Cl.
*G06K 9/00* (2006.01)
*G06T 7/70* (2017.01)
*G06K 9/48* (2006.01)

(52) U.S. Cl.
CPC ............ *G06K 9/00818* (2013.01); *G06T 7/70* (2017.01); *G06K 2009/485* (2013.01); *G06T 2207/30252* (2013.01)

(58) Field of Classification Search
CPC ......... G06K 2009/485; G06K 9/00818; G06K 9/00791; G06K 9/6279; G06K 9/4647;
(Continued)

(56) References Cited

U.S. PATENT DOCUMENTS 7,466,841 B2* 12/2008 Bahlmann .......... G06K 9/00818
382/103
2008/0137908 A1* 6/2008 Stein .................. G06K 9/00818
382/103
(Continued)

FOREIGN PATENT DOCUMENTS

CN 102956118 3/2013
DE 10 2012 213 344 1/2014
(Continued)

OTHER PUBLICATIONS

Office Action dated Feb. 20, 2017 for Korean Patent Application No. 10-2016-0036822 and its English translation by Global Dossier.
(Continued)

*Primary Examiner* — Yon Couso
(74) *Attorney, Agent, or Firm* — Ladas & Parry, LLP

(57) ABSTRACT

The invention relates to method of classifying an object (10) in an image (9), the method comprising the steps of:
  defining an image area (11) located within the object (10) in the image (9),
  decomposing the image area (11) into an array of subareas (13),
  defining an array of aggregated pixel values by calculating, for each of the subareas (13), an aggregated pixel value of the respective subarea (13),
  calculating a gradient array depending on differences between the aggregated pixel values of adjacent subareas (13),
  analyzing the gradient array,
  identifying, depending on a result of the analyzing step, the object (10) as belonging to a class of a predefined set of classes.

(Continued)

Figure 1:
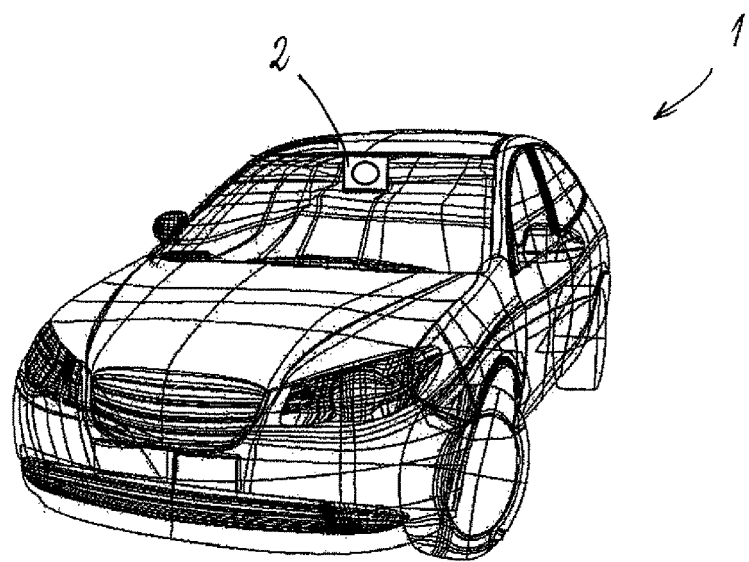

Furthermore, the invention relates to a device (4) for analyzing an object (10) contained in an image (9) and to a driver assistance system as well as to a vehicle (1) containing such a device (4).

17 Claims, 4 Drawing Sheets

(58) Field of Classification Search
CPC . G06T 7/70; G06T 2207/30252; B60R 11/04; H04N 7/183
See application file for complete search history.

(56) References Cited

U.S. PATENT DOCUMENTS

| | | | | |
|---|---|---|---|---|
| 2010/0067805 | A1* | 3/2010 | Klefenz | G06K 9/4633 |
| | | | | 382/201 |
| 2010/0310129 | A1* | 12/2010 | Hopfner | G06K 9/44 |
| | | | | 382/104 |
| 2011/0222779 | A1* | 9/2011 | Karanam | G06T 7/13 |
| | | | | 382/199 |
| 2015/0161441 | A1* | 6/2015 | Robinson | G06K 9/00791 |
| | | | | 382/113 |
| 2016/0162750 | A1* | 6/2016 | Haselhoff | G06K 9/00832 |
| | | | | 382/103 |

FOREIGN PATENT DOCUMENTS

| | | |
|---|---|---|
| DE | 10 2012 023 022 | 5/2014 |
| EP | 1 327 969 | 7/2003 |
| KR | 10-2012-0057351 | 6/2012 |
| KR | 10-1241813 | 3/2013 |
| WO | 2013/152929 | 10/2013 |

OTHER PUBLICATIONS

Office Action dated Aug. 28, 2017 for Korean Patent Application No. 10-2016-0036822 and its English translation by Global Dossier.

* cited by examiner

METHOD AND DEVICE FOR CLASSIFYING AN OBJECT IN AN IMAGE

CROSS-REFERENCE TO RELATED APPLICATION

This application claims the priority to German Patent Application No. 102015205524.8, filed on Mar. 26, 2015, the disclosure of which is incorporated herein by reference in its entirety.

The present invention relates to a method for classifying an object, such as a traffic sign, in an image as well as to a corresponding device for analyzing an object in an image. The invention further relates to a driver assistance system for providing information on classified traffic signs to a driver of a vehicle, and to a vehicle equipped with such a system.

Methods and devices for classifying an object in an image, i.e. identifying to which of a predefined set of classes (i.e. categories) the object belongs, are used in various technical areas. For example, object classification is used in the field of machine vision. For instance, modern driver assistance systems may be equipped with traffic sign recognition technology and be configured to detect and classify traffic signs in a surrounding of a vehicle in order to assist the driver in recognizing the information displayed on the traffic signs. Known issues with such systems, however, concern their robustness and efficiency, for instance, due to the sophisticated information displayed on the traffic signs or due to problems related to image noise.

For example, publication WO 2013/152929 A1 discloses a method to involve the vehicle driver in improving the ability of a system to recognize a traffic sign by adding a learning unit into the system. The driver may thus give a feedback to the system which then updates its parameters to improve its reliability. However, a learning unit significantly increases computational and memory storage requirements for the system.

Publication DE 10 2012 023 022 A1 discloses a method and system for recognizing text appearing in the image data and of computing a probability that words, numbers or abbreviations in the text are contained by traffic signs. The system is aiming to discard falsely detected candidates, so as to provide more reliable information to the vehicle driver. However, text recognition is always interfered by the differences between various fonts, and as a result, it may not be sufficiently robust.

Other traffic sign recognition methods have been disclosed, for example, in the publications CN 102956118 A, EP 1327969 A1 and DE 10 2012 213344 A1.

The purpose of the present invention is to suggest a method and a device for classifying an object in an image which are robust and fast and which require only relatively little memory capacity.

This problem is solved by a method for classifying an object in an image according to claim 1 and by a device for analyzing an object contained in an image according to claim 11. Particular embodiments of the invention are subject-matter of the dependent claims.

The suggested method for classifying an object in an image comprises the steps of:
defining an image area located within the object in the image,
decomposing the image area into an array of subareas,
defining an array of aggregated pixel values by calculating, for each of the subareas, an aggregated pixel value of the respective subarea,
calculating a gradient array depending on differences between the aggregated pixel values of adjacent subareas,
analyzing the gradient array,
identifying, depending on a result of the analyzing step, the object as belonging to a class of a predefined set of classes.

According to the suggested method, the pixel values of the pixels in the image area are aggregated for each of the subareas to reduce the amount of image data for the further analysis without, however, losing too much of useful image information. It has been found that the information contained in the gradient array defined based on the array of aggregated pixel values is still sufficient to be useful for the classification of the object. In fact, as is described further below, the step of analyzing the gradient array may involve steps that reduce the information contained in the gradient array even further.

The image is typically a digital image which is defined by image data. Each pixel of the image may have, for example, a pixel value, such as a brightness value and/or a colour value. Initially, the image (i.e. the image data) may optionally be pre-processed, for instance, by applying a scaling algorithm and/or by applying a colour transformation algorithm to the image data. Additionally or alternatively, the pre-processing of the image may include applying a noise reduction algorithm to reduce noise in the image data.

In order to define the above-mentioned image area, it may be necessary to first detect and/or locate the object in the image. The method may thus include applying an algorithm for detecting and/or locating the object in the image. For the purpose of defining the image area, it may be sufficient to locate an outer boundary of the object in the image. For instance, the image area may be defined such that it is located within an area defined by an outer boundary of the object in the image.

Typically, the array of subareas is defined such that each subarea has not more than two adjacent subareas and, correspondingly, the gradient array may be defined as a linear or one-dimensional array. In the step of decomposing the image area into the subareas, each of the subareas may, for example, be labelled with an index $n$ with $1 \leq n \leq N$, wherein $N$ denotes the total number of the subareas and wherein two neighbouring subareas have successive indices, i.e. the indices $n$ and $n+1$, for instance. Thus, the step of defining the array of aggregated pixel values may, actually, be a step of defining a vector of aggregated pixel values and assigning the aggregated pixel values of the subareas to components of the vector of aggregated pixel values. Then, typically, the vector of the aggregated pixel values has $N$ components such that there is a 1:1-correspondence between these vector components and the subareas. Preferably, the components of the vector of the aggregated pixel values are ordered such that the n-th component of this vector corresponds to the n-th subarea. The gradient array may, in this case, a gradient vector having $N-1$ components, wherein its components may be ordered such that the n-th component of the gradient vector is defined as the difference between the n-th and the (n+1)-th subarea (or as the difference between the n-th and the (n+1)-th component of the vector of aggregated pixel values). More generally, the gradient array may be obtained by calculating, for each pair of adjacent subareas among the above-mentioned subareas of the image area, a difference between the aggregated pixel values of the respective pair of subareas. The tus obtained differences may be assigned to the different indices of the gradient array so that the components of the gradient array are defined as those differences. Of course, the differences may also weighted using any constant or properly defined factor.

The aggregated pixel values of the subareas may be obtained by summing up pixel values of pixels contained in the respective subarea, i.e. by adding the pixel values of all pixels contained in the subarea. Alternatively, a weighted sum might be used as well.

The method may, in particular, be used to classify traffic signs or to check whether the object is a traffic sign and/or whether it belongs to a particular type of traffic signs. In other words, the object in the image may be a traffic sign or a candidate for a traffic sign, wherein the predefined set of classes includes a set of classes of traffic signs or at least one class of traffic signs. One of the classes may be the class of all other objects, i.e. of all objects that are no traffic signs or that do not belong to a particular class of traffic signs.

The method turns out to be particularly useful it the set of classes of traffic signs includes at least one class of speed limit signs, each of the speed limit signs of this class displaying a number with one-digit or two-digit or three-digit number. Usually, the class of speed limit signs will contain only numbers with two or three digits, a last digit of this number typically being zero or in some cases zero or five. If this class contains three-digit numbers, a first of the three-digit numbers is typically one. This makes it easy to identify an object as belonging to this class by just analyzing the gradient array. To be more specific, each one of the speed limit signs of this class may, for example, display one of the following set of numbers: "10", "20", "30", "40", "50", "60", "70", "80", "90", "100", "110", "120", "130", and "140".

If an object is identified as belonging to the at least one class of speed limit signs, the method may further comprise further analyzing the object for identifying the number displayed on this particular speed limit sign. This is, in particular, useful if the class or any of the classes of speed limit signs contains more than one speed limit sign in order to find out the actual speed limit represented by the number on the sign. This can be done by a method of the same type as the classifying method described here using different definitions for the classes, the image area, the subareas and/or the analyzing step. Alternatively, other known image processing methods may be used for reading the speed limit.

In this context, it is to be mentioned that another image processing step may be performed before the steps of the classifying method described here in order to find the object to be classified as a candidate for a traffic sign. This can be done, for example, be means of a circle detection algorithm. The method may thus include a step of detecting and/or localizing traffic signs or candidates for traffic signs in the image which are then classified used by the steps of the suggested classifying method.

In typical embodiments, the image area is or comprises a horizontal band. This band may, e.g., be rectangular. Alternatively, the area may have a circular of an elliptical or a completely different shape. It may be helpful if the image area is defined such that it extends over at least 50% of a total width of the object—i.e. 50% of an area defined by the object—and/or that a height of the image area is less than 20% of a total height of the object and/or that the image area includes a center of the object in the image.

As for the subareas of the image area, they may be defined, for example, as vertical strips. Normally, these strips will all have the same size. Alternatively, the area may be cut into slices of different shape and/or orientation, each of the slices being defined as one of the subareas.

Depending on the respective object in the image and on the definition of the image area and the classes, one or more characteristic features may occur in the image area depending on whether the object belongs to a particular class or not. If one of these features is present in the image area, it also becomes manifest in the array of aggregated pixel values and in the gradient array such that it can be determined by analyzing the gradient array. The occurrence of one or more of these features in the image area may thus be used as an indicator for the belonging of the respective object in the image to one or more of the classes of the predefined set of classes.

To find characteristic features of the object in the image area, the analyzing step may include comparing gradient values of the gradient array with at least one threshold value, defining a feature array by mapping the gradient values onto a smaller set of values depending on whether the respective value of the gradient array is larger or smaller than the at least one threshold value, and analyzing the feature array. This may be done, for example, using one positive and one negative threshold value, the smaller set of values consisting of three different values only, one of them (+1 e.g.) representing gradient values which are larger than the positive threshold value, one of them (−1 e.g.) representing gradient values which are smaller than the negative threshold value, and one of them (0 e.g.) representing all other gradient values. In addition or alternatively, positions of local maxima or minima of the gradient array may be determined and used for analyzing the gradient array.

In any case, the analyzing step may include comparing features of the gradient array with a predefined set of features. Typically, this is done by comparing the feature array and/or the position of local maxima or minima of the gradient array with reference data.

The predefined set of features may be obtained from ground truth data using a training set of objects. The training set of objects may, e.g., comprise traffic signs including speed limit signs of the type mentioned above.

In the typical example of identifying speed limit signs, the characteristic features of the image area may include two first regions consisting of pixels which have large pixel values, wherein the two first regions each have a predefined first width, and, located in between the two first regions and having a predefined second width which is greater than the first width, a second region consisting of pixels which have small pixel values, wherein the two first regions and the second region are found in a right half of the image area. These characteristic features may be an indicator that the object is a traffic sign displaying a "0" in the right half, which is a hint suggesting that the traffic sign belongs to the class of speed limit signs.

These characteristic features may become manifest in the gradient array, for instance, as follows. Two first sequences of components of the gradient array with small gradient values (corresponding to the above mentioned two first regions) will be seen, wherein at the beginning of each one of these two first sequences there is at least one component of the gradient array which has a large positive gradient value (e.g. above a predefined positive threshold) and which results in a local maximum of the gradient array, and wherein at the end of each one of these two first sequences there is at least one component of the gradient array which has a large negative gradient value (e.g. below a predefined negative threshold) and which results in a local minimum of the gradient array, wherein each of the two sequences have a predefined first width, and wherein, located in between the two sequences and having a predefined second width which is greater than the first width, there is a second sequence of components with small gradient values (corresponding to the above mentioned second region). The components of the two first sequences and of the second sequence will be found in the right half of the image area if the image area is defined as a horizontal band at a central level of the object or traffic sign candidate.

A useful device for analyzing an object contained in an image may comprising a data processing unit which is configured for performing the steps of the method described above. In particular, the data processing unit may be configured to perform the steps of:
- defining an image area located within the object in the image,
- decomposing the image area into an array of subareas,
- defining an array of aggregated pixel values by calculating, for each of the subareas, an aggregated pixel value of the respective subarea,
- calculating a gradient array depending on differences between the aggregated pixel values of adjacent subareas,
- analyzing the gradient array,
- identifying, depending on a result of the analyzing step, the object as belonging to a class of a predefined set of classes.

A driver assistance system may comprise, in addition to this device, at least one camera for generating images of a surrounding of a vehicle, and a driver information unit, wherein the data processing unit is coupled to the at least one camera to receive the images from the at least one camera and wherein the driver information unit is coupled to the data processing unit and configured to provide information on the objects classified as traffic signs and/or speed limit signs to a driver of the vehicle. In a vehicle which is equipped with this driver assistance system, the at least one camera may be installed to capture the surrounding of the vehicle in front of the vehicle, for example behind a windscreen, so that traffic signs will be sign in the images captured by the camera.

In the following, exemplary embodiments of the invention are described in more detail referring to the FIGS. 1 to 6. There are shown in FIG. 1 a perspective view of a vehicle with a driver assistance system, FIG. 2 a block diagram illustrating an embodiment of the driver assistance system, FIG. 3 a flow diagram illustrating steps of a method for assisting a driver of the vehicle, which may be performed by the driver assistance system of FIG. 2, FIG. 4 a speed limit sign in an image, FIG. 5 an image region of the image shown in FIG. 4, and FIG. 6 a diagram showing values of components of a gradient vector obtained using an embodiment of the suggested method.

In all figures, similar or identical features are marked with the same reference signs. A list of reference signs is provided below.

FIG. 1 shows a schematic representation of a vehicle 1. A driver assistance system is installed in the vehicle 1. In FIG. 1, a camera 2 of the driver assistance system is shown which is installed in the vehicle 1 in a position behind a front screen of the vehicle 1. In this way, digital images of a surrounding of the vehicle 1 in front of the vehicle 1 can be generated by means of this camera 2. The driver assistance system of the vehicle 1 may include further cameras (not shown in FIG. 1) mounted in the vehicle 1 at further positions, for example at a right side and a left side of the vehicle, such that images of the surrounding on both sides of the vehicle 1 may additionally be generated by means of these further cameras.

Figure 2:
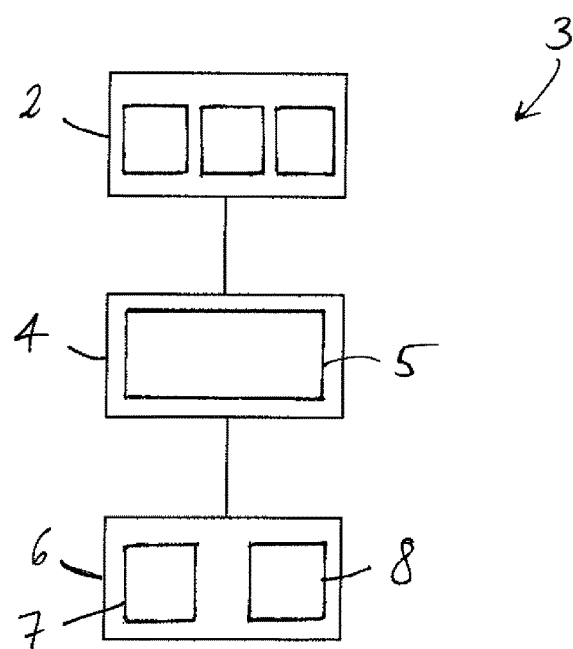

FIG. 2 shows an embodiment of the driver assistance system 3, which may be installed in the vehicle 1. The driver assistance system 3 includes the at least one camera 2 and a device 4 for processing images. The device 4 is configured to receive signals from the camera 2. The signals represent the images captured by the camera 2 and include image data, such as pixel values of those images. The device 4 includes an image data processing unit 5 which is configured to process the images, i.e. the image data. More specifically, the data processing unit 5 is configured to detect and locate objects that are candidates for traffic signs—this can be done, for example, by means of a circle detection algorithm—and to further classify them as speed limit signs, other traffic signs, and other object that turn out not to be traffic signs. Moreover, the processing unit is configured to recognize the specific speed limit displayed on any object classified as speed limit sign, i.e. to recognize the number "10", "20", "30", "40", "50", "60", "70", "80", "90", "100", "110", "120", "130", or "140" displayed on the respective speed limit sign. To do so, the data processing unit 5 is configured to perform a method of classifying objects in the images which is described in detail below. For that purpose, the data processing unit 5 may comprise one ore more electronic data processors and one or more data storage units.

The driver assistance system 3 further includes a driver information unit 6 which is configured to provide information on the detected and classified traffic signs to a driver of the vehicle 1 based on signals received from the device 4. In the present example, the driver information unit 6 comprises a display 7 and a loudspeaker 8. The display 7 may, for instance, be a head-up display configured to display the information on the front screen of the vehicle in which the system 3 is installed.

Figure 3:
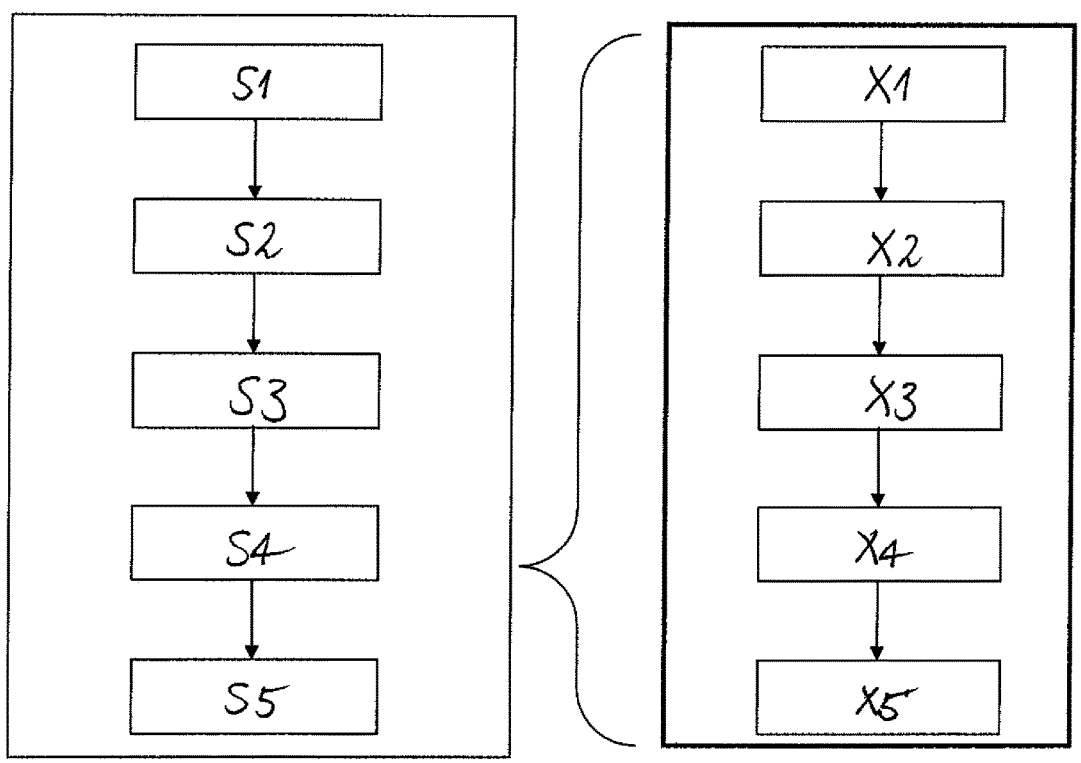

FIG. 3 shows a flow diagram which represents method steps of an embodiment of the method of classifying an object in an image. For instance, the object in the image may be a traffic sign or a candidate of a traffic sign. These method steps may be performed, for instance, by means of the driver assistance system 3 shown in FIG. 2. The description of the method also refers to FIG. 4, which shows a simplified digital image 9 as it may be captured by the camera 2 and processed by the device 4 of the driver assistance system 3.

Figure 4:
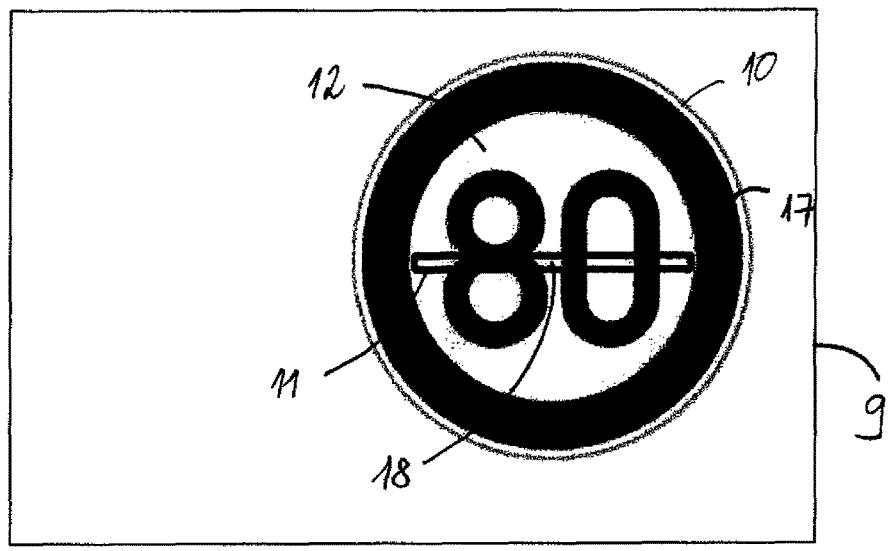

In step S1, a digital image, such as the image 9 shown in FIG. 4, is generated by the camera 2 and received by the data processing unit 5. Typically, this image 9 is a single frame of a video produced by the camera 2. In the present example shown in FIG. 4, the image 9 contains an object 10.

In step S2, the data processing unit 5 pre-processes the image 9 by applying a scaling algorithm and a color transformation algorithm, for instance.

In step S3, the object 10 is detected and identified as a candidate of a traffic sign. In the present case, step S3 includes applying a circle detection algorithm or an ellipse detection algorithm for detecting and identifying candidates for traffic signs in the image 9.

In step S4, an embodiment of the suggested classifying method which includes the steps X1 to X5 described below is performed to further classify the identified candidates for traffic signs, such as object 10, to either belong to the class of speed limit signs or to belong to the class of all other traffic signs or to a class of objects that actually are not traffic signs. In the present embodiment, each speed limit sign of the class of speed limit signs displays one of the following set of numbers: "10", "20", "30", "40", "50", "60", "70", "80", "90", "100", "110", "120", "130", and "140". Furthermore, for those objects that are identified as speed limit signs, the actual speed limit displayed on the speed limit sign is identified.

The object 10 defines an area 12 in the image 9. In step X1, an image area 11 located within the area 12 is defined. FIG. 4 illustrates how this is done. In the present case, the traffic sign shown in FIG. 4 is a speed limit sign which includes an outer ring 17. The area 12 might be defined such that it is restricted to a center area bounded by this annular ring 17. Alternatively, the area 12 may be defined as the total area of the object 10 so that it is defined by outer edges of the object 10.

In the present case, the image area 11 may be defined such that it extends over approximately ⅔ of a total width of the area 12 defined by outer edges of the object 10 or, alternatively, over approximately the total width of the area 12 defined within the outer ring 17 of the object 10. Furthermore, the image area 11 may be defined such that it extends over less than 10% of a total height of the area 12. In the present case, the image area 11 is defined such that its width is more than 10 times greater than its height. Furthermore, the image area 11 is defined such that it covers a center 18 of the area 12 defined by the object 10. The image area 11 has, in the present case, a rectangular shape. Alternatively it could also be shaped as a parallelogram, as a circle, or as an ellipse, for example.

Figure 5:
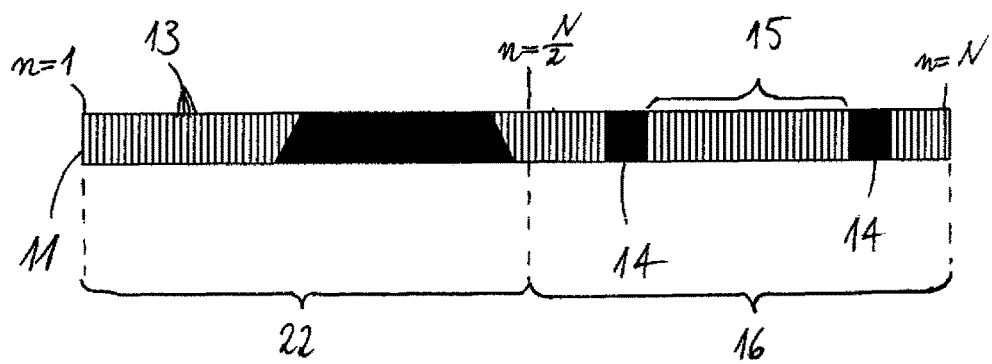

In step X2, the image area 11 is decomposed into an array of subareas 13 as shown in FIG. 5. The subareas 13 are defined such that each pixel of the image area 11 is contained in exactly one of these subareas 13. In particular, the subareas 13 do not intersect or overlap each other and cover the image area 11 completely. The subareas 13 of the image area 11 are shaped, in this embodiment of the method, as narrow vertical strips, wherein each of the strips has a uniform width of one pixel, a length of the subareas 13 corresponding to the height of the image area 11. The subareas 13 are oriented parallel to each other and parallel to the vertical axis of the image 9.

As shown in FIG. 5, each of the subareas 13 is labelled with an index n with $1 \leq n \leq N$, wherein N denotes the total number of the subareas 13 and wherein two neighbouring subareas have successive indices, i.e. the indices n and n+1, for instance. Accordingly, the leftmost subarea 13 has the index n=1, a subarea 13 in the middle of the image area 11 has the index n=N/2, and the rightmost subarea 13 has the index n=N.

Furthermore, in step X2, for each of the subareas 13, an aggregated pixel value of the subarea is calculated by aggregating pixel values of image pixels contained in the respective subareas 13. In the present example, the aggregated pixel value of each one of the subareas 13 is defined as the sum of the pixel values of the pixels contained in the subarea 13.

A vector, i.e. a one-dimensional array, of aggregated pixel values which has N components is defined and the aggregated pixel values of the subareas 13, i.e. the pixel sums, are assigned to the components of the vector of aggregated pixel values. The vector of the aggregated pixel values has N components such that there is a 1:1-correspondence between these vector components and the subareas. The N components of the vector of the aggregated pixel values are ordered such that the n-th component of this vector corresponds to the n-th subarea 13, i.e. the first component corresponds to the leftmost subarea 13 and the N-th component to the rightmost subarea 13.

In step X3, for each pair of adjacent subareas of the subareas 13 of the image area 11, a difference between the aggregated pixel values of the subareas 13 of the respective pair of adjacent subareas 13 is calculated. An N−1 dimensional gradient vector is defined and the differences between the aggregated pixel values of the pairs of adjacent subareas 13 are assigned to the N−1 components of the gradient vector. The N−1 components of the gradient vector are ordered such that the n-th component of the gradient vector is defined as the difference between the n-th and the (n+1)-th component of the vector of aggregated pixel values.

Figure 6:
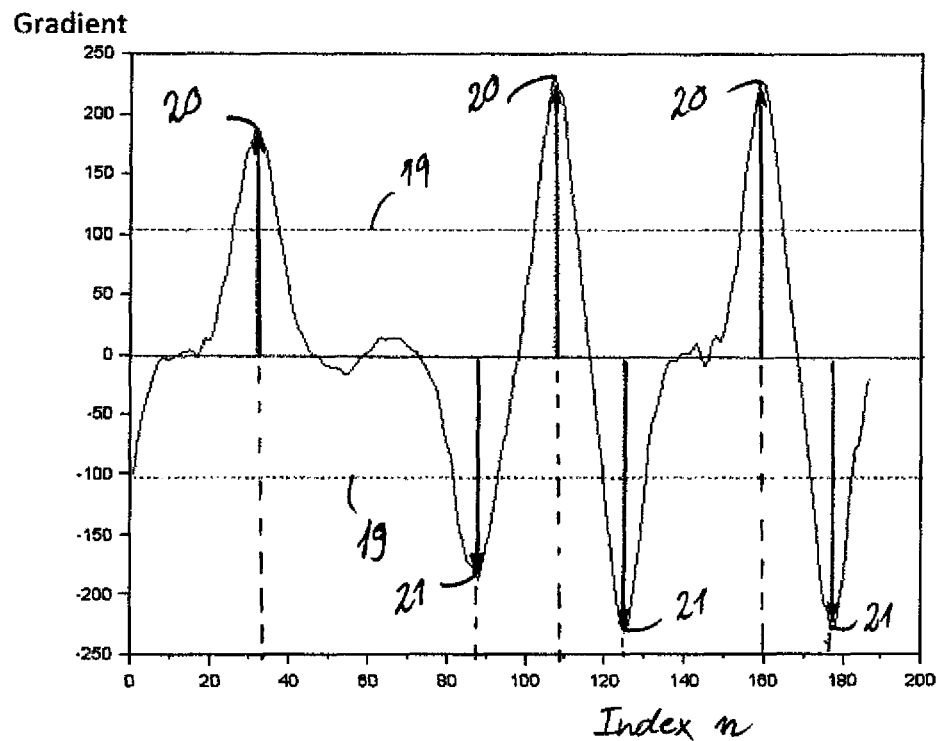

In the diagram shown in FIG. 6, the values of the components of the gradient vector are represented schematically as a continuous function of the index n.

In step X4, the gradient vector is analyzed with regard to a predefined set of possible features of the image area 11. The analysis includes applying a threshold algorithm to the components of the gradient. In the present embodiment, the threshold algorithm includes comparing the components of the gradient vector with a positive threshold and with a negative threshold. In the present example, the positive threshold is set to +100 and the negative threshold is set to −100 as illustrated by horizontal lines 19 in FIG. 6. Then, a feature vector is defined by applying a non-maximum suppression algorithm to the output of the threshold algorithm such that all components of the gradient vector which are neither above the positive threshold nor smaller than the negative threshold are set to zero. All components of the gradient vector that are above the positive threshold are set to 1 and all components that are smaller than the negative threshold are set to −1. Alternatively, all components of the gradient vector which are neither local maxima nor local minima as well as all components of the gradient vector that are in between the two thresholds could be set to zero, while only those components of the gradient vector that are local maxima and above the positive threshold are set to 1 and only those local minima that are smaller than the negative threshold are set to −1 In the case illustrated by FIGS. 5 and 6, the gradient vector has three local maxima 20 that are above the positive threshold line 19 at the indices n=33, n=109 and n=160, respectively, and three local minima 21 below the negative threshold line 19 at the indices n=88, n=125 and n=176, respectively. Hence, after application of these algorithms, the values of the components of the feature vector will be +1 at the indices n=33, n=109 and n=160, negative at the indices n=88, n=125 and n=176, and zero elsewhere or, depending of the definition of the step X4, at least everywhere except in small intervals around the indices n=33 n=88, n=109, n=125, n=160, and n=176.

The thus obtained feature vector is further analyzed with regard to the occurrence of one or more predefined possible features of the image area 11. This could be done, for example, by means of a support vector machine and/or applying hierarchical rules. In the present embodiment, the feature array is analyzed by comparing its components with reference data and, in particular, by checking whether the feature vector shows some particular predefined features which are characteristic for the class of speed limit signs. These predefined features are defined using a set of training objects. In the present case, the set of training objects consists of actual speed limit signs that display the above-mentioned set of numbers. In particular, the term "predefined features" does not imply that they are fixed once and for all. Even if they are predefined for the individual classification procedure, they may actually be defined dynamically applying machine learning techniques. In FIG. 6, features of the gradient vector and, thus, of the feature vector, can be seen for the typical in case where the object 10 is the traffic sign of FIG. 4 or a similar speed limit sign.

Characteristic features of the image area 11 which are used for defining the predefined features of the feature array can be seen in FIG. 5. These characteristic features include, in particular, two first regions 14, consisting of pixels which have large pixel values, wherein the two first regions 14 each have a first width, and, located in between the two first regions 14 and having a second width which is greater than the first width, a second region 15 consisting of pixels which have small pixel values, the first regions 14 and the second region 15 lying within a right half 16 of the image area 11, wherein the right half 16 typically corresponds to indices n>N/2, see FIG. 5. These features of the image area 11 are used as an indicator that the traffic sign candidate, i.e. the object 10, displays a "0" in its right half which again is used as an indicator that the traffic sign belongs to the class of speed limit signs.

In the feature vector, these features result in the following characteristics, which may be used as predefined features for identifying the object 10 as belonging to the class of speed limit signs: Two first sequences of components of the feature vector are zero (corresponding to the above mentioned two first regions 14), wherein at the beginning of each one of these two first sequences there is a component of the gradient vector which is +1, and wherein at the end of each one of these two first sequences there is a component of the gradient vector which is −1, wherein each of the two sequences has a predefined first width, and wherein, located in between the two first sequences and having a predefined second width which is greater than the first width, there is a second sequence of components (corresponding to the above mentioned second region 15) having zero values, wherein the indices of the components of the first two sequences and of the second sequence are all larger than N/2.

In case of the image area 11 shown in FIGS. 4 and 5, these predefined features are found. Thus, the object 10 will be classified as a speed limit sign. Furthermore, the components of the gradient vector with indices n<N/2 which correspond to a remaining left half 22 of the image area 11 are then analyzed for further features in order to determine the actual speed limit displayed on the speed limit sign.

Thus, in step X5, depending on a result of the analysis of the gradient vector and the feature vector, the traffic sign candidate, i.e. object 10, is identified as to either belong to the class of speed limit signs or to belong to the class of all other traffic signs. In the exemplary case of the object 10 shown in FIG. 4, the object 10 is classified as a speed limit sign showing the speed limit "80".

In step S5, the classification of the object 10 by means of the steps X1 to X5 is used, for instance, for a further classification of the object 10. For instance, if one or more features of the predefined set of features of the image area 11 have been found, this is used as an indicator that the object 10 is in fact a traffic sign or belongs to a certain class of traffic signs. For instance, if it has been found in steps X1 to X5 that the traffic sign candidate is no speed limit sign, further classification steps may be performed in step S5. These further steps, however, may be omitted if the traffic sign candidate has been classified as a speed limit sign by means of steps X1 to X5, as in the exemplary case of the speed limit sign shown in FIG. 4.

LIST OF REFERENCE SIGNS 1 vehicle
2 camera
3 driver assistance system
4 device
5 data processing unit
6 driver information unit
7 display
8 loudspeaker
9 image
10 object
11 image area
12 area defined by the object
13 subarea of image area
14 first region
15 second region
16 right half of the image area
17 ring
18 center
19 threshold line
20 local maximum
21 local minimum
22 left half

The invention claimed is:

1. A driver assistance system, comprising:
at least one camera for generating images of a surrounding of a vehicle;
a data processing unit is configured to:
define an image area located within the object in the image,
decompose the image area into an array of subareas,
define an array of aggregated pixel values by calculating, for each of the subareas, an aggregated pixel value of the respective subarea,
calculate a gradient array depending on differences between the aggregated pixel values of adjacent subareas,
analyze the gradient array, and
identify depending on a result of the analyzing the gradient array, the object as belonging to a class of a predefined set of classes; and
a driver information unit coupled to the data processing unit and providing information on the objects classified as traffic signs and/or speed limit signs to a driver of the vehicle,
wherein the aggregated pixel values of the subareas are obtained by summing up pixel values of pixels contained in the respective subarea.

2. The system of claim 1, wherein the object in the image is a traffic sign or a candidate for a traffic sign and wherein the predefined set of classes includes a set of classes of traffic signs.

3. The system of claim 2, wherein the set of classes of traffic signs includes at least one class of speed limit signs, each of the speed limit signs of this class displaying a number with one-digit or two-digit or three-digit number.

4. The system of claim 3, wherein the data processing unit is configured to analyze the object identified as belonging to the at least one class of speed limit signs for identifying the number displayed on this particular speed limit sign.

5. The system of claim 1, wherein the image area is or comprises a horizontal band.

6. The system of claim 1, wherein the subareas of the image area are vertical strips.

7. The system of claim 1, wherein the analyzing the gradient array includes comparing gradient values of the gradient array with at least one threshold value, defining a feature array by mapping the gradient values onto a smaller set of values depending on whether the respective value of the gradient array is larger or smaller than the at least one threshold value, and analyzing the feature array.

8. The system of claim 1, wherein the data processing unit is configured to compare features of the gradient array with a predefined set of features.

9. The system of claim 8, wherein the predefined set of features is obtained from ground truth data using a training set of objects.

10. A vehicle comprising the driver assistance system of claim 1, wherein the at least one camera is installed in the vehicle to capture the surrounding of the vehicle in front of the vehicle.

11. A method for classifying an object in an image, comprising:

generating, by at least one image capturing device, an image around a vehicle, defining, by a data processing unit connected to the image capturing device, an image area located within the object in the image, decomposing, by the data processing unit, the image area into an array of subareas, defining, by the data processing unit, an array of aggregated pixel values by calculating, for each of the subareas, an aggregated pixel value of the respective subarea, calculating, by the data processing unit, a gradient array depending on differences between the aggregated pixel values of adjacent subareas, analyzing, by the data processing unit, the gradient array, identifying, by the data processing unit, depending on a result of the analyzing the gradient array, the object as belonging to a class of a predefined set of classes, and providing, by a driver information unit, information related to the object to a driver of the vehicle, wherein the aggregated pixel values of the subareas are obtained by summing up pixel values of pixels contained in the respective subarea, and wherein the object in the image is a traffic sign or a candidate for a traffic sign and wherein the predefined set of classes includes a set of classes of traffic signs.

12. The method of claim 11, wherein the set of classes of traffic signs includes at least one class of speed limit signs, each of the speed limit signs of this class displaying a number with one-digit or two-digit or three-digit number.

13. The method of claim 12, further comprising analyzing the object identified as belonging to the at least one class of speed limit signs for identifying the number displayed on this particular speed limit sign.

14. The method of claim 11, wherein the image area is or comprises a horizontal band.

15. The method of claim 11, wherein the subareas of the image area are vertical strips.

16. The method of claim 11, wherein the analyzing the gradient array includes comparing gradient values of the gradient array with at least one threshold value, defining a feature array by mapping the gradient values onto a smaller set of values depending on whether the respective value of the gradient array is larger or smaller than the at least one threshold value, and analyzing the feature array.

17. The method of claim 1, wherein the analyzing the gradient array includes comparing features of the gradient array with a predefined set of features.

\* \* \* \* \*